United States Patent [19]

Kishi et al.

[11] Patent Number: 4,621,959
[45] Date of Patent: Nov. 11, 1986

[54] AREA CUTTING METHOD

[75] Inventors: Hajimu Kishi; Masaki Seki; Takashi Takegahara; Yasushi Onishi, all of Tokyo, Japan

[73] Assignee: Fanuc Ltd, Minamitsuru, Japan

[21] Appl. No.: 744,746

[22] PCT Filed: Oct. 12, 1984

[86] PCT No.: PCT/JP84/00484

§ 371 Date: Jun. 10, 1985

§ 102(e) Date: Jun. 10, 1985

[87] PCT Pub. No.: WO85/01683

PCT Pub. Date: Apr. 25, 1985

[30] Foreign Application Priority Data

Oct. 22, 1983 [JP] Japan .................. 58-198040

[51] Int. Cl.[4] .......... B23C 3/20; G06F 15/46
[52] U.S. Cl. .................. 409/84; 364/475; 409/80; 409/132
[58] Field of Search .......... 364/474, 475, 520; 409/131, 132, 79, 80, 84; 51/326

[56] References Cited

U.S. PATENT DOCUMENTS 4,533,286  8/1985  Kishi et al. .................. 409/131 X

FOREIGN PATENT DOCUMENTS 691252  10/1979  U.S.S.R. .................. 409/132
733877   5/1980  U.S.S.R. .................. 409/132

Primary Examiner—Gil Weidenfeld
Assistant Examiner—Steven C. Bishop
Attorney, Agent, or Firm—Staas & Halsey

[57] ABSTRACT

An area cutting method for cutting the interior of an area (AR) bounded by an external shape curve (OLC) including a number of straight lines (S1, S2, ... S6) and a circular arc (A1). The method includes linearly approximating a circular arc portion (A1') of an offset curve (OFC) which is offset a predetermined amount from the external shape curve. Then an area bounded by the linearly approximated offset curve is divided into a plurality of convex polygons (PG1-PG3). The centroid (Wi) of each convex polygon and the mid-points (M1, M2) of boundary lines (B1, B2) of two mutually adjacent convex polygons are calculated, and a base line (BL) is generated by successively connecting each centroid and each mid-point. Straight lines (L1-L14) connecting the centroids (Wi) of the convex polygons and the apices (P1-P10) of the convex polygons, and straight lines (BL1-BL4) connecting the mid-points (M1, M2) and the two ends (P1, P4; P4, P7) of the boundary lines bisected by the mid-points are partitioned into a predetermined number of partitions. A tool is moved along plural closed paths (CPT1, CPT2, ...) obtained by connecting partitioning points ($P_{a1}$, $P_{a2}$, ... $P_{a18}$; $P_{b1}$, $P_{b2}$, ... $P_{b18}$), which correspond to the straight lines (L1-L14, BL1-BL4), in such a manner that the base line (BL) is enclosed. The tool is moved along the base line (BL) and along the offset curve (OFC).

15 Claims, 16 Drawing Figures

AREA CUTTING METHOD

BACKGROUND OF THE INVENTION

This invention relates to an area cutting method in a numerically controlled machine tool and, more particularly, to an area cutting method for cutting the interior of an area bounded by straight lines and circular arcs.

Forms of numerically controlled machining include cutting in which the interior of an area bounded by straight lines and circular arcs is hollowed out down to a predetermined depth, and die milling in which the interior of an area is die milled. In such machining, as shown in FIG. 1(A), an area cutting method is conventionally carried out by performing cutting along an (i−1)th cutting path PTi−1 in one direction (the direction of the solid line arrow), raising the tool a predetermined amount at the completion of cutting, then positioning the tool directly above a cutting starting point Ps on the next, or i-th, cutting path PTi, thereafter lowering the tool to the cutting starting point Ps, moving the tool along the i-th cutting path PTi in the direction of the solid line arrow, and subsequently repeating the above unidirectional cutting.

Another area cutting method shown in FIG. 1(B) includes, following completion of cutting along the cutting path PTi−1 of the (i−1)th cutting path, moving the tool from a cutting end point Pe to the cutting starting point Ps on the next, or i-th, cutting path, and thereafter performing cutting along the i-th cutting path PTi. Thus, cutting is performed back and forth in the direction of the arrows.

Still another area cutting method shown in FIG. 1(C) includes obtaining offset paths OFC1, OFC2, ... OFCn offset by predetermined amounts with respect to a curve OLC of an external shape, and moving the tool successively aong the offset paths.

However, with the first area cutting method based on unidirectional cutting, the tool must be positioned at the cutting starting point Ps on the i-th cutting path PTi after the completion of cutting along the (i−1)th cutting path PTi−1. This method is disadvantageous in that it results in a long tool travelling distance.

With the second cutting method based on reciprocative cutting, portions are left uncut. In order to cut the uncut portions, the tool must be moved along the external shape curve OLC at completion of the back-and-forth cutting, thereby necessitating both back-and-forth cutting control and cutting control along the shape of the external curve. Accordingly, this method is disadvantageous in that control is complicated. Further, if an area AR has concavities and convexities, as shown in FIG. 1(D), the second method requires movement for achieving positioning indicated by the dashed lines. This is disadvantageous in that tool travelling distance and cutting time are prolonged. In addition, since the cutting process for the outward trip is different from the cutting process for the return trip, cutting cannot be performed efficiently overall. It should be noted that the cutting processes referred to here indicate up cutting and down cutting processes. FIGS. 2(A), (B) show examples of the down cutting process, and FIGS. 2(C), (D) depict examples of the up cutting process. If the workpiece material has been selected, then a cutting method capable of cutting the workpiece efficiently is selected from the up cutting and down cutting processes. However, with the second method, the up cutting process [e.g., FIG. 2(A)] and the down cutting process [e.g., FIG. 2(C)] are always mixed, so that cutting cannot be performed efficiently.

With the third method of cutting along the offset paths, portions are left uncut at, e.g., the central portion of the area, depending upon the contour of the external shape curve. This method is disadvantageous in that dealing with these uncut portions is a complicated task.

SUMMARY OF THE INVENTION

Accordingly, an object of the present invention is to provide an area cutting method whereby the interior of an area can be cut continuously without requiring control for raising a tool, positioning the tool at the next cutting starting point and then lowering the tool.

Another object of the present invention is to provide an area cutting method wherein portions are not left uncut.

The present invention provides an area cutting method for cutting the interior of an area bounded by the curve of an external shape. The area cutting method has a first step of dividing an area bounded by an offset curve offset a predetermined amount from the curve of the external shape into a plurality of convex polygons; a second step of calculating the centroid of each convex polygon and the mid-points of boundary lines of two mutually adjacent convex polygons; a third step of partitioning, into a predetermined number of partitions, line segments connecting the centroid of each convex polygon and the apices of the convex polygon, and line segments connecting each mid-point and the two ends of the boundary line bisected by the mid-point; a fourth step of moving a tool along plural closed paths obtained by connecting partitioning points corresponding to each line segment; and a fifth step of moving the tool along the offset curve. According to the present invention, area cutting can be carried out while moving the tool continuously. This eliminates wasted tool movement, shortens cutting time and does not leave any uncut portions at, e.g., the central part of the area.

DETAILED DESCRIPTION OF THE PREFERRED EMBODIMENT

Figure 1A:
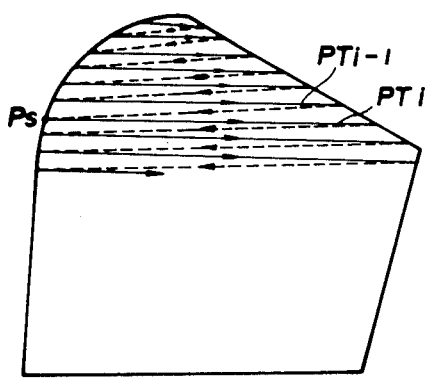
FIGS. 1(A), 1(B), 1(C) and 1(D) are diagrams for describing conventional area cutting methods.
Figure 1B:
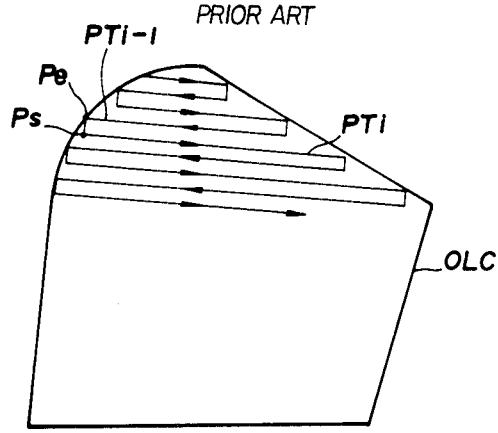
Figure 1C:
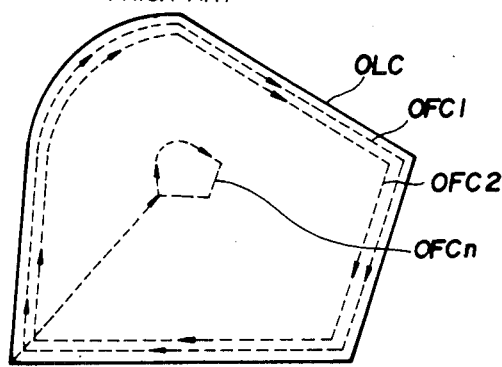
Figure 1D:
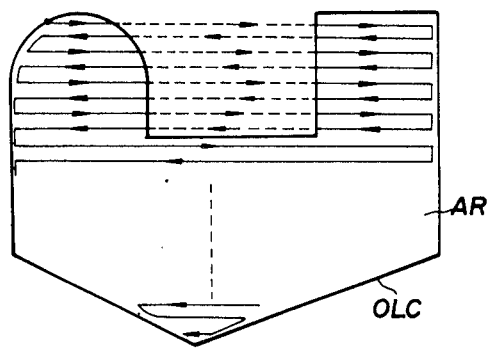
Figure 2A:
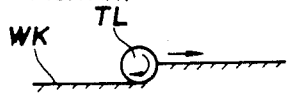
FIGS. 2(A), 2(B), 2(C) and 2(D) are diagrams for describing up cutting and down cutting processes.
Figure 2B:
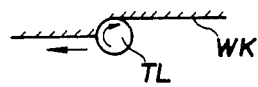
Figure 2C:
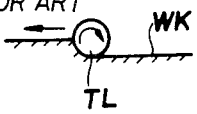
Figure 2D:
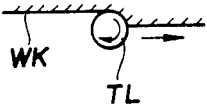
Figure 3A:
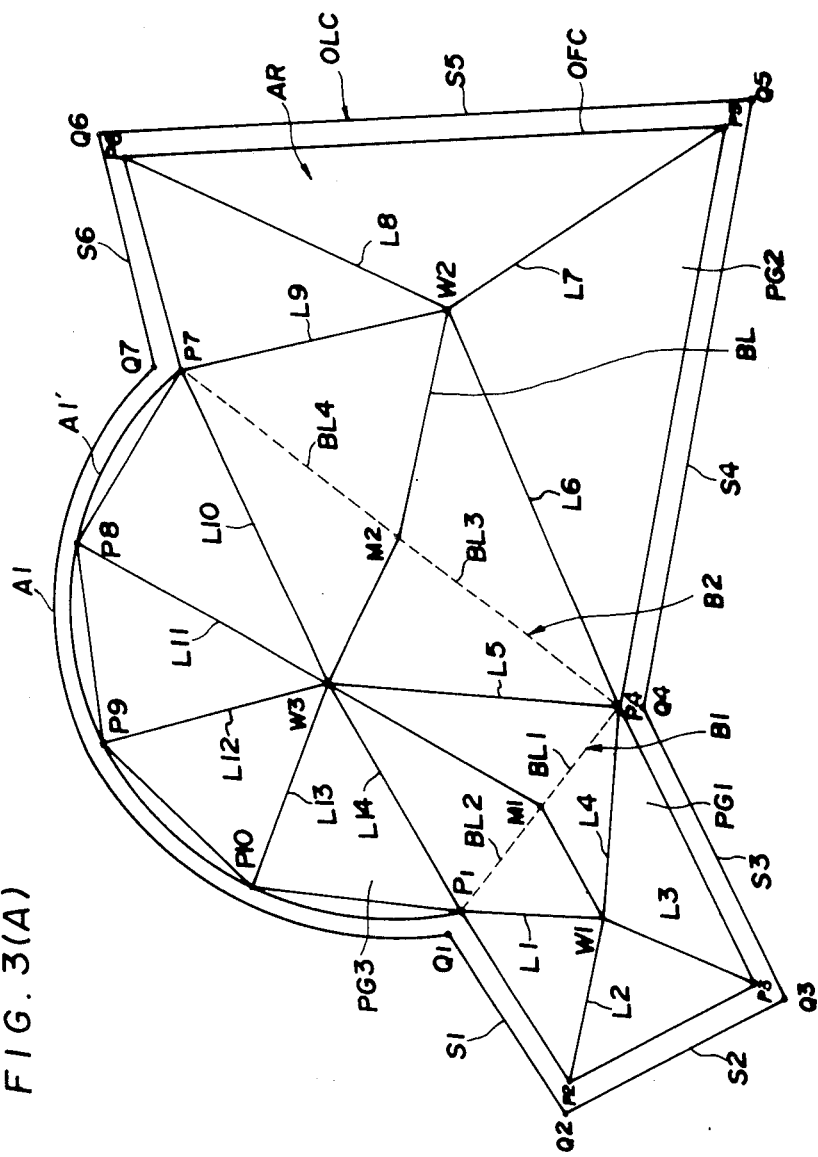
FIGS. 3(A) and 3(B) are diagrams for describing the general features of the present invention.
Figure 3B:
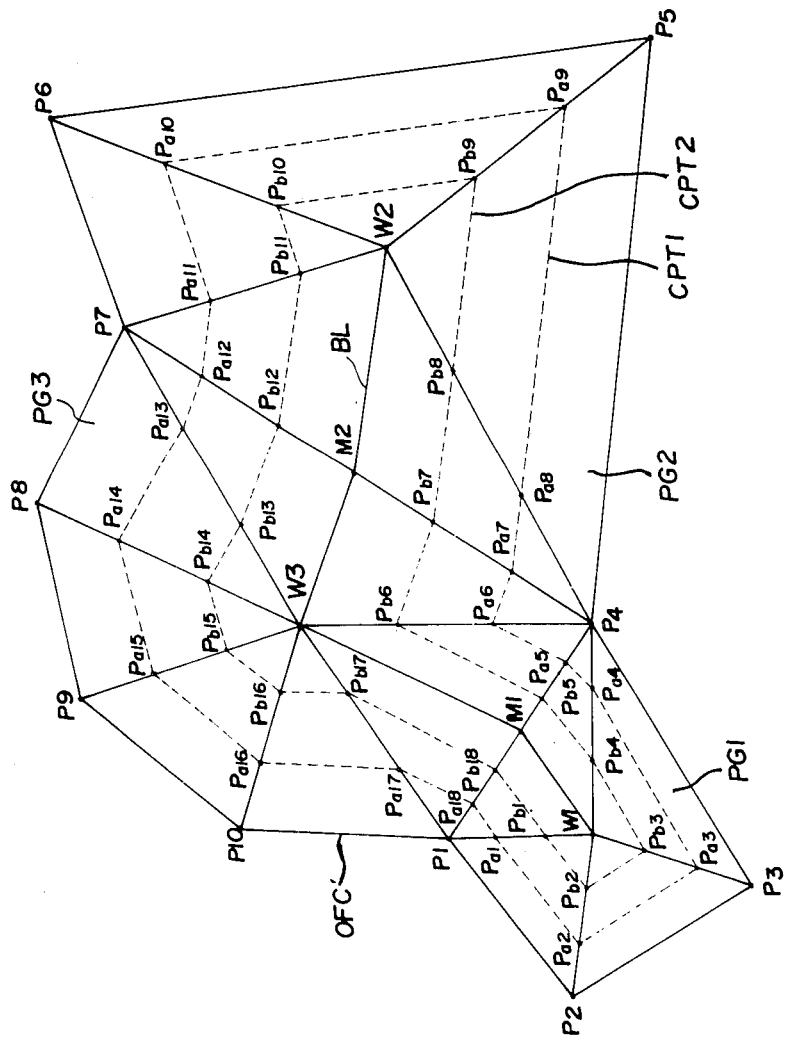

FIGS. 3(A) and 3(B) are diagrams for describing the general features of the present invention. For cutting the interior of an area bounded by an external shape curve OLC comprising a number of straight lines S1, S2, ... S6 and a circular arc A1, the invention includes steps of linearly approximating a circular arc portion A1' of an offset curve OFC, offset a predetermined amount from the external shape curve; dividing an area bounded by the linearly approximated offset curve into a plurality of convex polygons PG1 through PG3; calculating the centroid Wi of each convex polygon, and the mid-points M1, M2 of boundary lines B1, B2 of two mutually adjacent convex polygons; generating a base line BL obtained by successively connecting each centroid and each mid-point; partitioning, into a predetermined number of partitions, straight lines L1 through L14 connecting the centroids Wi of the convex polygons and the apices P1 through P10 of the convex polygons, and straight lines BL1 through BL4 connecting the mid-points M1, M2 and the two ends P1, P4; P4, P7 of the boundary lines bisected by the mid-points; moving a tool along plural closed paths CPT1, CPT2, . . . obtained by connecting partitioning points $P_{a1}, P_{a2}, \ldots a_{18}; P_{b1}, P_{b2}, \ldots b_{18}$ [see FIG. 3(B)], which correspond to the straight lines L1 through L14 and BL1 through BL4, in such a manner that the base line BL is enclosed; moving the tool along the base line BL; and moving the tool along the offset curve OFC.

Figure 4:
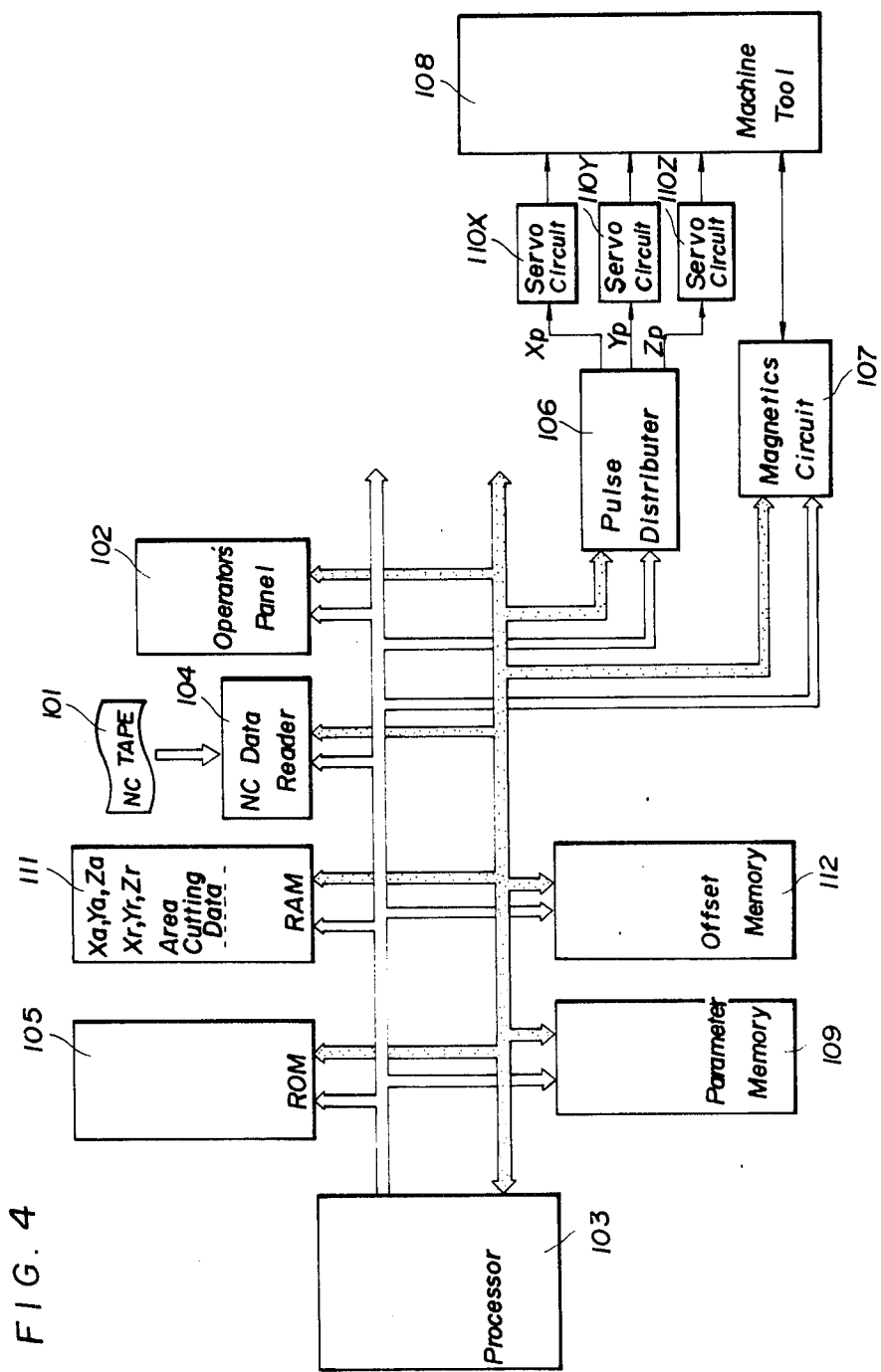
FIG. 4 is a block diagram of an embodiment of the present invention.
Figure 5:
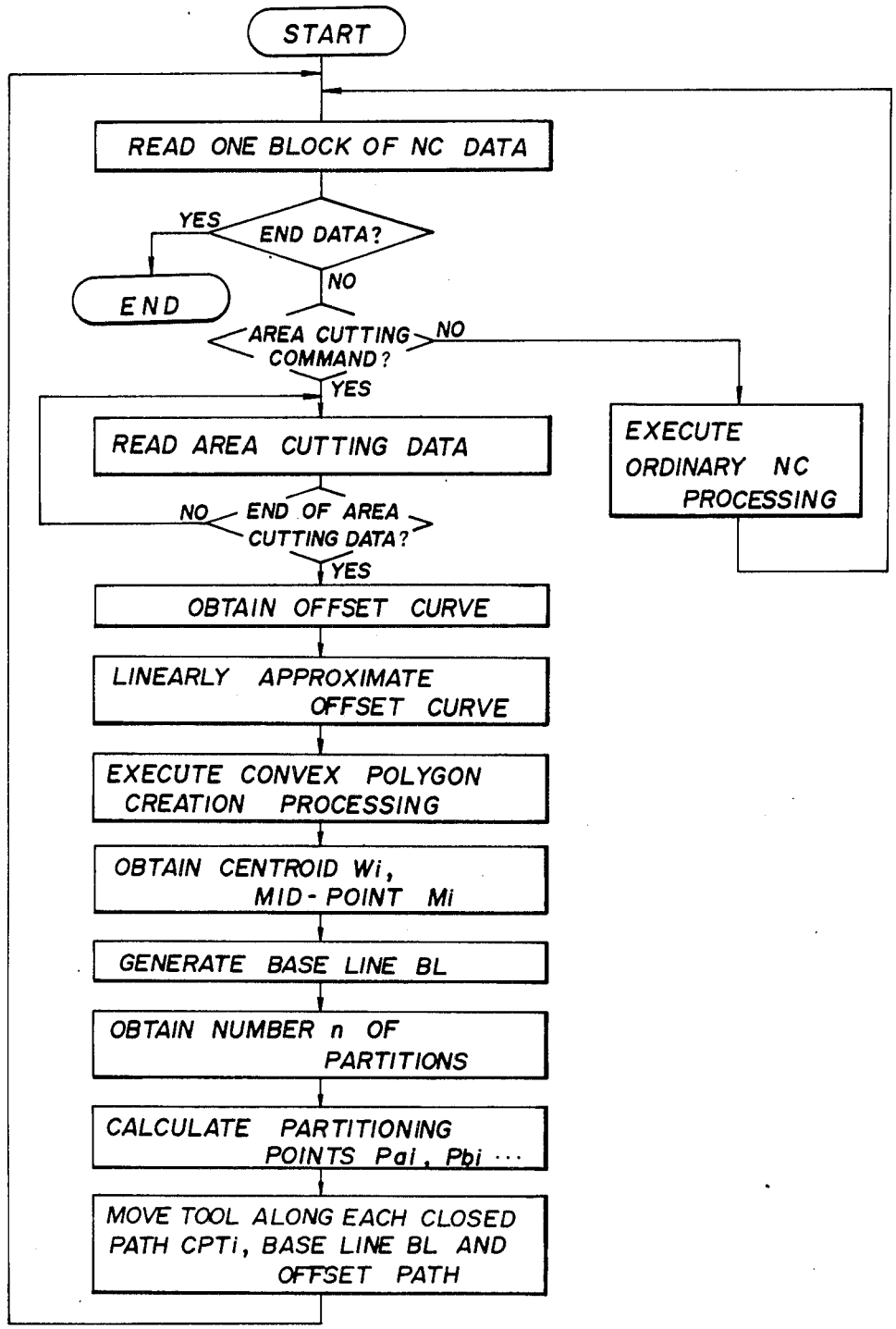
FIG. 5 is a flowchart of the processing for carrying out the area autting method of the present invention.

FIG. 4 is a block diagram of an embodiment of the present invention, and FIG. 5 is a flowchart of the processing by the embodiment of FIG. 4. The area cutting method of the present invention will now be described in conjunction with FIGS. 3 through 5.

Area cutting data necessary for area cutting are recorded at appropriate locations on an NC tape or memory (assumed to be an NC tape hereafter) 101. Specifically, in addition to ordinary numerical control data, area cutting instructions, coordinate values $(x_j, y_j)$ of the apices Q1, Q2, Q3, . . . Qn of the area, the radius $r_j$ of each circular arc, finishing margin t, cut-in pitch P, cutting velocity fc, and data for identifying the end of the area cutting data, are recorded on the NC tape 101. Note that the positions of the apices and the radii of the circular arcs are commanded in sets in the form, e.g., $(x_j, y_j, r_j)$, with $r_j = 0$ being commanded in the case of straight lines. Accordingly, in the area cutting of the area AR shown in FIG. 3, the area is specified by $Xx_1 \ Yy_1 \ R0$;
$Xx_2 \ Yy_2 \ R0$;
$Xx_3 \ Yy_3 \ R0$;
$Xx_4 \ Yy_4 \ R0$;
$Xx_5 \ Yy_5 \ R0$;
$Xx_6 \ Yy_6 \ R0$;
$Xx_7 \ Yy_7 \ Rr$;

(1) When a cycle start button on an operator's panel 102 is pressed to start the system, a processor 103 causes an NC data reader 104 to read one block of NC data from an NC tape 101.

(2) Next, under the control of a control program stored in a ROM 105, the processor 103 decodes the read NC data and determines whether the NC data are indicative of program end "M02" or tape end "M30".

(3) If program end or tape end is indicated, processing is stopped. If the NC data are path data, then these data are delivered to a pulse distributor 106. If an item of NC data is an M-, S- or T-function instruction to be delivered to the machine side, then the instruction is applied to a machine tool 108 through a magnetics circuit 107. If an item of data is an area cutting instruction, then the NC data reader 104 is caused to read the area cutting data.

When an item of NC data is path data, the processor 103 finds incremental values Xi, Yi, Zi along the respective axes. The processor 103 then uses a three-dimensional command velocity F and the incremental values Xi, Yi, Zi along the respective axes to obtain velocity components, $F_x, F_y, F_z$ along the respective axes from equations $$F_x = X_i \cdot F / \sqrt{X_i^2 + Y_i^2 + Z_i^2} \quad (1a)$$

$$F_y = Y_i \cdot F / \sqrt{X_i^2 + Y_i^2 + Z_i^2} \quad (1b)$$

$$F_z = Z_i \cdot F / \sqrt{X_i^2 + Y_i^2 + Z_i^2} \quad (1c)$$

and thereafter obtains travelling quantities $\Delta X, \Delta Y, \Delta Z$, which are to be traversed along the respective axes in a predetermined period of time $\Delta T$ seconds (=16 msec), from equations $$\Delta X = F_x \cdot \Delta T \quad (2a)$$

$$\Delta Y = F_y \cdot \Delta T \quad (2b)$$

$$\Delta Z = F_z \cdot \Delta T \quad (2c)$$

The processor delivers $\Delta X, \Delta Y, \Delta Z$ to the pulse distributor 106 every $\Delta T$ sec. Note that $\Delta T$ is stored beforehand in a parameter memory 109.

On the basis of the input data, the pulse distributor 106 performs a simultaneous three-axis pulse distribution calculation to generate distributed pulses Xp, Yp, Zp. These are delivered to servo circuits 110X, 110Y, 110Z for the respective axes to transport the tool along the cutting path.

The processor 103, in accordance with the following formulae, updates the present position $X_a, Y_a, Z_a$ every $\Delta T$ sec, $X_a, Y_a, Z_a$ having been stored in a RAM 111:

$$X_a \pm \Delta X \rightarrow X_a \quad (3a)$$

$$Y_a \pm \Delta Y \rightarrow Y_a \quad (3b)$$

$$Z_a \pm \Delta Z \rightarrow Z_a \quad (3c)$$

The sign depends upon the direction of movement. Similarly, in accordance with the following formulae, the processor 103 updates remaining traveling distances $X_r, Y_r, Z_r$ (the initial values of which are the incremental values $X_i, Y_i, Z_i$, respectively) every $\Delta T$ sec, $X_r, Y_r, Z_r$ having been stored in the RAM 111:

$$X_r - \Delta X \rightarrow X_r \quad (4a)$$

$$Y_r - \Delta Y \rightarrow Y_r \quad (4b)$$

$$Z_r - \Delta Z \rightarrow Z_r \quad (4c)$$

When the following condition is established:

$$X_r = Y_r = Z_r = 0 \quad (5)$$

the processor 103 treats this as indicating that the movable element has arrived at a target position and causes the NC data reader 104 to read the next item of NC data.

(4) If an item of NC data read from the NC tape 101 is found to be an area cutting command, the processor 103 causes the NC data reader 104 to read the area cutting data and store the data in the RAM 111 until the code indicating the end of the area cutting data is read out.

Figure 6:
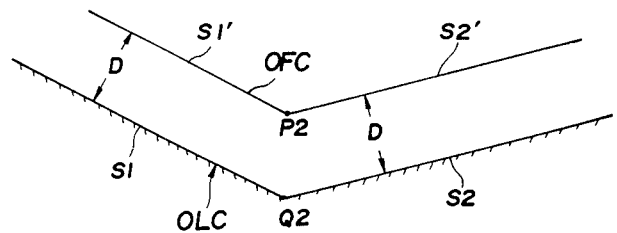
FIG. 6 is a diagram for describing a method of calculating an offset curve.

(5) When the reading of the area cutting data ends, the processor 103 calculates the curve OFC, which is offset from the curve OLC (FIG. 3) of the external shape by a distance D (=ra+t), the latter being obtained by adding the tool radius ra and the finishing margin t. It should be noted that the tool radius ra is obtained by reading a radius value corresponding to a commanded tool number from an offset memory 112, which stores the correspondence between tool numbers and tool radii. The offset curve OFC is found through the following processing. Specifically, as shown in FIG. 6, let two straight lines specifying the curve OLC of the external shape be S1 and S2. Straight lines S1', S2' offset from the straight lines S1, S2, respectively, by the distance D are found. The intersection P2 of the straight lines S1', S2' is then found. The intersection P2 is one point specifying the offset curve OFC. Accordingly, if points of intersection are found in a similar manner and stored in the RAM 111, the offset curve OFC will be obtained.

(6) The processor 103 now linearly approximates the circular arc portion of the offset curve OFC. In performing the linear approximation processing, it is so arranged that the maximum distance between the circular arc portion and the straight line takes on a value smaller than the cut-in pitch. FIG. 7 is a diagram for describing the linear approximation processing.

Figure 7A:
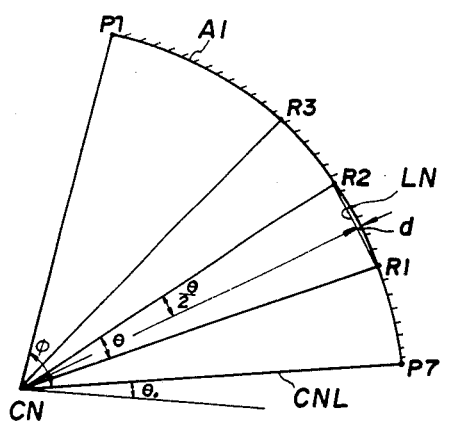
FIGS. 7(A) and 7(B) are diagrams for describing a method of linear approximation of a circular arc portion.

For a case where the inner side of a circular arc A1 is the area to be cut, as shown in FIG. 7(A), the maximum distance d between the circular arc A1 and the straight line (chord) LN is given by $$d = r - r \cdot \cos(\theta/2) \tag{6}$$

where the radius of the arc is r and the central angle of the chord LN is $\theta$. Accordingly, the central angle $\theta$ for which $d \leq P$ holds, namely the central angle $\theta$ that satisfies the relation $$\cos(\theta/2) \geq 1 - (P/r) \tag{7}$$

is found, the central angle $\phi$ of the circular arc A1 is partitioned at the angle $\theta$, and the coordinate values of each partitioning point $R_i$ are stored in the RAM 111. This ends the processing for linear approximation. If we let the coordinate values of the starting point P7 of circular arc A1 be $(x_7, y_7)$ and let the angle between the X axis and a straight line CNL connecting the center CN of the circular arc and the starting point P7, be $\theta_o$, then the coordinate values $(x_i, y_i)$ of an i-th partitioning point $R_i$, for a case where the arc center CN is taken as the origin, may be calculated from the equations $$x_i = x_7 \cdot \cos(i \cdot \theta) - y_7 \cdot \sin(i \cdot \theta) \tag{8a}$$

$$y_i = y_7 \cdot \cos(i \cdot \theta) - x_7 \cdot \sin(i \cdot \theta) \tag{8b}$$

Figure 7B:
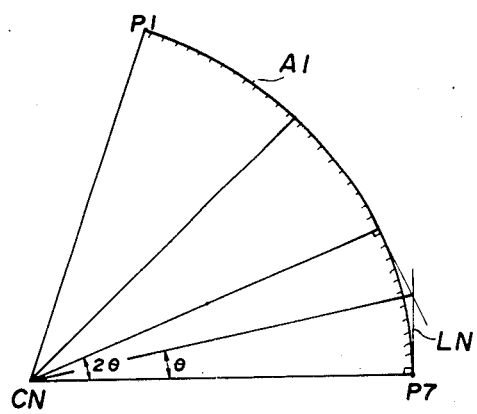

For a case where the outer side of a circular arc A1 is the area to be cut, as shown in FIG. 7(B), the maximum distance d between the circular arc A1 and the straight line LN is given by $$d = (r/\cos\theta) - r \tag{9}$$

Accordingly, the angle $\theta$ for which $d \leq P$ holds, namely the angle $\theta$ that satisfies the relation $$\cos\theta \geq r/(r+P) \tag{10}$$

is found, the point $R_i$ linearly approximating the circular arc portion on the basis of $\theta$ is found, and this is stored in the RAM 111. This ends the processing for linear approximation.

(7) When the linear approximation processing ends, the processor 103 performs convex polygon creation processing for dividing, into plural convex polygons PG1 through PG3, the area bounded by an offset curve OFC' [see FIG. 3(B)], obtained by the linear approximation.

The processor first determines whether the point P3 or a second line segment P2, P3 lies on the left side or right side of a first line segment P1, P2 connecting a first point [taken as point P1 in FIG. 3(B)] and a second point P2 of the linearly approximated offset curve OFC'. Thereafter, and in similar fashion, the processor checks the side on which an i-th line segment Pi, Pi+1 lies with respect to an (i-1)th line segment Pi−1, Pi. When the side (right side) on which the i-th line segment (line segment P4, P5 in the example of FIG. 3) lies with respect to the (i-1)th line segment (line segment P3P4 in the example of FIG. 3) differs from the side (left side) which has so far prevailed, the polygon P1, P2 . . . Pi (P1, P2, P3, P4 in the illustrated embodiment) is stored as the first convex polygon PG1 in the RAM 111. If the foregoing processing is repeated in a similar manner with the above-mentioned i-th line segment serving as the first line segment for creating the next convex polygon, the area bounded by the offset curve OFC' will be divided into plural convex polygons PG1 through PG3.

Figure 8:
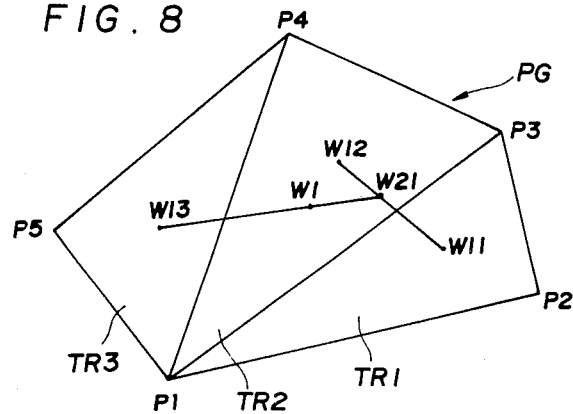
FIG. 8 is a diagram for describing a method of calculating a centroid.

(8) When the processing for creating the convex polygons ends, the processor 103 calculates the centroids W1 through W3 of the respective convex polygons PG1 through PG3, and the mid-points M1, M2 of the boundary lines B1, B2 of two mutually adjacent convex polygons. The coordinate values of the centroid of a convex polygon are calculated through processing which will now be described. As shown in FIG. 8, a convex polygon PG is broken down into a plurality of triangles TR1 through TR3 and the centroids W11 through W13 and areas SQ1 through SQ3 of the respective triangles are calculated. Next, a point W21 that divides a line segment W12, W11 connecting the centroids W11, W12 into the ratio SQ1:SQ2 (area ratio) is found. Note that the point W21 is the centroid of a quadrilateral P1P2P3P4. After the point W21 is calculated, a point W1 is found that divides a line segment W13, W21 into the area ratio (SQ1+SQ2):SQ3. The point W1 is the centroid of the convex polygon PG.

(9) When the centroid Wi (i=1, 2, 3) and mid-points M1, M2 are found in the above manner, the coordinate values of the centroids and mid-points are stored in the RAM 111 in the order W1, M1, W3, M2, W2. This generates the base line BL.

(10) When generation of the base line ends, the processor 103 obtains, and stores in the RAM 111, the coordinate values of partitioning points $P_{a1}, P_{b1}, \ldots$; $P_{a2}, P_{b2}\ldots$; $P_{a3}, P_{b3}, \ldots$; $P_{a18}, P_{b18}\ldots$ that partition, into a predetermined number of partitions, line segments connecting the centroids (W1 through W3) of the convex polygons PG1 through PG3 and the apices of the convex polygons, and line segments connecting the mid-points (M1, M2) and the ends (P1, P4; P4, P7) of the boundary lines (B1, B2) bisected by the mid-points. As for the number n of partitions, the length l of the longest of all the above-mentioned line segments is found, after which n is so decided as to satisfy the relation $$P \geq 1/n.$$

(11) When the coordinate values of the partitioning points of each of the line segments are found, there are generated plural closed paths CPT1, CPT2, . . . obtained by connecting the partitioning points $P_{a1}$, $P_{a2}$, $P_{a3}$ . . . $P_{a18}$; $P_{b1}$, $P_{b2}$, $P_{b3}$ . . . $P_{b18}$; . . . , which correspond to each of the foregoing line segments, in such a manner that the base line BL is enclosed. The tool is moved along each closed path, then along the base line BL, and then along the offset curve OFC or OFC'. The area AR can thus be cut.

Accordingly, by using the coordinate values of the starting point $P_{a1}$ of the first closed path CPT1 stored in the RAM 111 through the above-described processing, the processor 103 obtains numerical data (incremental values between an initial position and the starting point $P_{a1}$) for making the tool approach the starting point $P_{a1}$ from the initial position, and thereafter executes path control based on the aforementioned Eqs. (1a) through (5) by using the incremental values.

When the approach is completed, the processor moves the tool to the point $P_{a2}$ along the first closed path CPT1 in a cutting feed mode and thereafter successively moves the tool along the first closed path in the manner $P_{a2} \rightarrow P_{a3} \rightarrow P_{a4}$ . . . $\rightarrow P_{a18}$ to perform cutting. When the cutting along the first closed path CPT1 ends, the tool is shifted to the point $P_{b1}$ and cutting is subsequently performed along the second closed path CPT2. Thereafter, cutting is performed along similarly generated closed paths. Then the tool is moved along the base line BL in the cutting feed mode, and finally the tool is moved along the offset curve OFC or OFC' in accordance with the data specifying the offset curve OFC or OFC' stored in the RAM 111. This ends the area cutting processing. Thereafter, the next item of NC data is read from the NC tape and the foregoing processing is repeated.

Though a case has been described where the tool movement sequence is CPT1→CPT2→ . . . →BL→OFC when performing cutting, the present invention is not limited to this sequence and cutting can be carried out first along the offset curve OFC or the base line BL if desired. Further, the present invention is not limited to the illustrated embodiment. It is possible to adopt an arrangement wherein an NC tape (NC data) containing tool path data for area cutting is prepared through the above-described method and the NC data are fed into an NC unit to cut the area.

According to the present invention, area cutting is carried out while a tool is moved in a continuous manner, thereby eliminating wasted tool movement and shortening cutting time.

In addition, according to the present invention, it is arranged so that the distance between an i-th closed path and an (i+1)th closed path is varied along the cut profile, and so that the tool is moved along the base line. Consequently, portions are not left uncut at, say, the central portion of the area.

Further, according to the present invention, tool paths can be generated automatically merely by entering area cutting data.

Thus, the present invention is well-suited for application to area cutting performed by a machine tool, or to the creation of NC data for area cutting.

We claim:

1. An area cutting method for cutting the interior of an area bounded by a curve of an external shape, comprising the steps of:
   (a) dividing the bounded area into a plurality of convex polygons having boundary lines therebetween;
   (b) calculating the centroid of each of the convex polygons and the mid-points of the boundary lines of two mutually adjacent convex polygons;
   (c) partitioning, into a predetermined number of partitions for each of the convex polygons, line segments connecting the centroid of the convex polygon and the apices of the convex polygon, and partitioning, into a predetermined number of partitions for each of the mid-points, line segments connecting the mid-point and the two ends of the boundary line bisected by the mid-point; and
   (d) moving a tool along plural closed paths obtained by connecting partitioning points corresponding to the line segments.

2. An area cutting method according to claim 1, wherein said step (a) includes the substeps of obtaining an offset curve which is offset a predetermined amount from the curve of the external shape, and dividing an area bounded by the offset curve into plural convex polygons.

3. An area cutting method according to claim 1, wherein when the curve of the external shape is composed of circular arcs and straight lines, said step (a) includes substeps of obtaining an offset curve, which is offset a predetermined amount from the curve of the external shape, linearly approximating a circular arc portion of the offset curve to obtain a linear offset curve, and dividing an area bounded by the linear offset curve into plural convex polygons.

4. An area cutting method according to claim 3, further comprising the step of moving the tool along a base line obtained by connecting the centroids and the mid-points.

5. An area cutting method according to claim 4, further comprising the step of moving the tool along the linear offset curve.

6. An area cutting method according to claim 5, wherein the predetermined amount is the sum of a finishing margin and cutter diameter.

7. An area cutting method according to claim 5, wherein when the circular arc portion is approximated by the linear offset curve, it is so arranged that a maximum distance between the circular arc portion and the approximating linear offset curve is smaller than a predetermined cut-in pitch.

8. An area cutting method according to claim 5, wherein when a side on which an (i+1)th line segment of the linear offset curve lies with respect to an i-th line segment, differs from a side on which the i-th line segment lies with respect to an (i−1)th line segment, said step (a) comprises generating one convex polygon by a line segment connecting a starting point of the i-th line segment and a starting point of a first line segment, the one convex polygon including the first, second, . . . i-th line segments, and wherein the (i+1)th line segment serves as the first line segment for generating the next convex polygon.

9. An area cutting method according to claim 5, wherein said step (c) includes determining the number of partitions in such a manner that the length of a partitioned line segment, obtained by partitioning by the number of partitions a line segment of the maximum length among the line segments connecting the centroids and the apices, and the line segments connecting the mid-points and the two ends, is smaller than a predetermined cut-in pitch.

10. An area cutting method according to claim 5, wherein when the convex polygon is a quadrilateral, said step (b) includes dividing the quadrilateral into first and second triangles, calculating the centroids and areas of the respective first and second triangles, and partitioning a straight line connecting the centroids at a partitioning point based on the ratio of the areas of the first and second triangles, and wherein the partitioning point serves as the centroid of the quadrilateral.

11. An area cutting method according to claim 5, wherein said step (b) includes dividing the convex polygon into plural triangles, calculating the centroids and areas of the respective triangles, partitioning a line segment, which connects the centroids of first and second neighboring triangles, by a partitioning point based on the ratio of the area of the first triangle to the area of the second triangle, adopting the partitioning point as the centroid of a quadrilateral obtained by combining the first and second triangles, partitioning a line segment which connects the centroid of the quadrilateral and the centroid of a third triangle, by a partitioning point based on the ratio of the area of the quadrilateral to the area of the third triangle, adopting the partitioning point as the centroid of a pentagon obtained by combining the first, second and third triangles, and continuing calculation of a partitioning point based on the ratio of the area of a polygon for which the centroid has been calculated to the area of a neighboring triangle, until the centroid of the convex polygon is calculated.

12. An area cutting method for cutting the interior of an area bounded by a curve of an external shape, comprising the steps of:
(a) dividing, into plural convex polygons having boundary lines therebetween, an area bounded by an offset curve which is offset a predetermined amount from the curve of the external shape;
(b) calculating the centroid of each of the convex polygons and the mid-points of the boundary lines of two mutually adjacent convex polygons;
(c) generating a base line obtained by successively connecting the centroids and the mid-points;
(d) partitioning, into a predetermined number of partitions for each of the convex polygons, line segments connecting the centroid of the convex polygon and the apices of the convex polygon, and partitioning, into a predetermined number of partitions for each of the mid-points, line segments connecting the mid-point and the two ends of the boundary line bisected by the mid-point;
(e) creating NC data for moving a tool along plural closed paths obtained by connecting partitioning points corresponding to the partitioned line segments, in such a manner that the base line is enclosed, creating NC data for moving the tool along the base line, and creating NC data for moving the tool along the offset curve; and
(f) performing area cutting on the basis of the NC data.

13. An area cutting method according to claim 12, wherein when the curve of the external shape is composed of circular arcs and straight lines, said step (a) includes substeps of obtaining an offset curve which is offset a predetermined amount from the curve of the external shape, linearly approximating the circular arc portion of the offset curve to obtain a linear offset curve, and dividing an area bounded by the linear offset curve into plural convex polygons.

14. An area cutting method for cutting the interior of an area bounded by a curve, comprising the steps of:
(a) automatically dividing the bounded area into a plurality of convex polygons having boundary lines therebetween;
(b) automatically calculating the centroid of each of the convex polygons;
(c) automatically calculating the mid-point of each of the boundary lines between the convex polygons;
(d) automatically generating, for each of the convex polygons, line segments connecting the centroid and the apices of the convex polygon, and partitioning the line segments so as to generate at least one partitioning point on each of the line segments;
(e) automatically partitioning each of the boundary lines so as to generate partition points on each of the boundary lines;
(f) automatically generating a base line by connecting the centroids of the convex polygons and the mid-points of the boundary lines;
(g) automatically generating closed paths by connecting the partitioning points in such a manner that the base line is enclosed; and
(h) moving a tool along the plural closed paths obtained in said step (g) so as to perform area cutting.

15. An area cutting method according to claim 14, wherein when the curve is composed of straight lines and at least one circular arc, said step (a) includes the substeps of:
(a1) obtaining an offset curve which is offset by a predetermined amount from the curve;
(a2) obtaining a linear offset curve by linearly approximating the circular arc portion of the offset curve; and
(a3) dividing the area bounded by the linear offset curve into the convex polygons.

* * * * *

UNITED STATES PATENT AND TRADEMARK OFFICE
CERTIFICATE OF CORRECTION

PATENT NO. : 4,621,959
DATED : NOVEMBER 11, 1986
INVENTOR(S) : HAJIMU KISHI ET AL.

It is certified that error appears in the above-identified patent and that said Letters Patent is hereby corrected as shown below:

Col. 4, in equations (1a) to (1c), change all occurrences of:

$$"X_1^2 + Y_1^2 + Z_1^2" \text{ to } --X_i^2 + Y_i^2 + Z_i^2--.$$

Signed and Sealed this

Twenty-seventh Day of January, 1987

*Attest:*

DONALD J. QUIGG

*Attesting Officer*     *Commissioner of Patents and Trademarks*